(12) United States Patent
Suh et al.

(10) Patent No.: US 12,093,961 B2
(45) Date of Patent: Sep. 17, 2024

(54) CRYPTOCURRENCY TRANSACTION ANALYSIS METHOD AND APPARATUS

(71) Applicant: S2W INC., Gyeonggi-do (KR)

(72) Inventors: Sang Duk Suh, Seongnam-si (KR); Changhoon Yoon, Seongnam-si (KR); Seung Hyeon Lee, Daejeon (KR)

(73) Assignee: S2W INC., Suwon-si (KR)

( * ) Notice: Subject to any disclaimer, the term of this patent is extended or adjusted under 35 U.S.C. 154(b) by 210 days.

(21) Appl. No.: 17/640,617

(22) PCT Filed: Jan. 30, 2020

(86) PCT No.: PCT/KR2020/001386
§ 371 (c)(1),
(2) Date: Mar. 4, 2022

(87) PCT Pub. No.: WO2021/045331
PCT Pub. Date: Mar. 11, 2021

(65) Prior Publication Data
US 2022/0343330 A1 Oct. 27, 2022

(30) Foreign Application Priority Data
Sep. 5, 2019 (KR) .................... 10-2019-0110106

(51) Int. Cl.
*G06Q 20/40* (2012.01)
*G06Q 20/06* (2012.01)

(52) U.S. Cl.
CPC ....... *G06Q 20/4016* (2013.01); *G06Q 20/065* (2013.01); *G06Q 2220/00* (2013.01)

(58) Field of Classification Search
None
See application file for complete search history.

(56) References Cited

U.S. PATENT DOCUMENTS

2015/0287026 A1* 10/2015 Yang .................... G06Q 20/065
705/69
2018/0240107 A1 8/2018 Andrade
(Continued)

FOREIGN PATENT DOCUMENTS

KR 10-2013-0096565 A 8/2013
KR 10-1852107 B1 4/2018
(Continued)

OTHER PUBLICATIONS

International Search Report of PCT/KR2020/001386 dated May 27, 2020 [PCT/ISA/210].
(Continued)

*Primary Examiner* — Jamie R Kucab
(74) *Attorney, Agent, or Firm* — Sughrue Mion, PLLC

(57) ABSTRACT

The present disclosure relates to a method for detecting a scam address of cryptocurrency using a machine learning model, and the method comprises: acquiring information about scam addresses labeled as being used for a scam transaction and information about benign addresses labeled as being used for a normal transaction from a database; acquiring information about a mule address group used for money laundering on the basis of the scam address group; acquiring feature information corresponding to each of the benign addresses and the addresses included in the scam address group or the mule address group on the basis of at least one of the information about the benign addresses, the information about the scam address group, and the information about the mule address group; and generating a machine learning model by machine learning of the feature information corresponding to each of the addresses and label information corresponding to each of the addresses.

10 Claims, 9 Drawing Sheets

(56) References Cited

U.S. PATENT DOCUMENTS

| | | | | |
|---|---|---|---|---|
| 2020/0160344 A1* | 5/2020 | Jevans | ................. | G06Q 20/065 |
| 2020/0184479 A1* | 6/2020 | Benkreira | .......... | G06Q 20/0658 |
| 2020/0311790 A1* | 10/2020 | Keren | ................ | G06Q 20/4016 |
| 2020/0371833 A1* | 11/2020 | Baset | ................... | G06F 16/2379 |
| 2021/0042421 A1* | 2/2021 | Li | ............................ | H04L 9/50 |
| 2022/0101326 A1* | 3/2022 | Kim | .................... | H04L 63/0464 |

FOREIGN PATENT DOCUMENTS

| | | |
|---|---|---|
| KR | 10-2018-0055170 A | 5/2018 |
| KR | 10-1966366 B1 | 8/2019 |

OTHER PUBLICATIONS

Written Opinion of PCT/KR2020/001386 dated May 27, 2020 [PCT/ISA/237].

* cited by examiner

CRYPTOCURRENCY TRANSACTION ANALYSIS METHOD AND APPARATUS

CROSS REFERENCE TO RELATED APPLICATIONS

This application is a National Stage of International Application No. PCT/KR2020/001386, filed Jan. 30, 2020, claiming priority to Korean Patent Application No. 10-2019-0110106, filed Sep. 5, 2019.

TECHNICAL FIELD

The present disclosure relates to a method and apparatus for detecting a scam address of cryptocurrency using a machine learning model. More specifically, the present disclosure may derive feature information from already acquired information about scam addresses and information about benign addresses to generate a machine learning model.

BACKGROUND ART

Cryptocurrency is a digital asset designed to function as exchange means, and refers to electronic information that is encrypted with blockchain technology, is distributed and issued, and can be used as currency in a certain network. Cryptocurrency is not issued by a central bank, but is electronic information, a monetary value of which is digitally displayed on the basis of blockchain technology, is distributed, stored, operated, and managed in a P2P manner on the Internet. The core technique for issuing and managing cryptocurrency is blockchain technology. The blockchain is a list of records (blocks) that are continuously increasing, and blocks are connected using an encryption method to ensure security. Each block typically includes a crypto hash, a timestamp, and transaction data. The blockchain has resistance to data modification from the beginning, and is an open distributed ledger that can permanently and validly prove transactions between two parties. Accordingly, cryptocurrency enables transparent operation based on anti-tampering.

In addition, cryptocurrency has anonymity, unlike the existing currency, so that third parties other than a transmitter and a receiver cannot know the transaction details at all. Due to the anonymity of the account, it is difficult to track the flow of transactions (non-trackable), and although all records such as remittance records and collection records are publicly available, the subject of the transaction cannot be known.

Cryptocurrency is considered as an alternative to the existing key currency due to aforementioned freedom and transparency, and is expected to be effectively used for international transactions and the like with lower fees and simple remittance procedures compared to the existing currency. However, due to the anonymity, cryptocurrency is sometimes used as a means of crime, such as being used for scam transactions.

Meanwhile, there is a problem in that it is difficult to determine the scam subject by manually discerning the features of the scam transaction due to the massive amount of data of the cryptocurrency transaction. In this regard, machine learning can automatically learn relationships between massive amounts of data.

Accordingly, there is a need for a method to identify the transaction subject who uses cryptocurrency as criminal means using machine learning.

SUMMARY OF INVENTION

Solution to Problem

A method for detecting a scam address of cryptocurrency using a machine learning model according to the present disclosure comprises: acquiring information about scam addresses labeled as being used for a scam transaction and information about benign addresses labeled as being used for a normal transaction from a database; acquiring information about a scam address group determined to be owned by the same user on the basis of the information about the scam addresses; acquiring information about a mule address group used for money laundering on the basis of the scam address group; acquiring feature information corresponding to each of the benign addresses and the addresses included in the scam address group or the mule address group on the basis of at least one of the information about the benign addresses, the information about the scam address group, and the information about the mule address group; and generating a machine learning model by machine learning of the feature information corresponding to each of the addresses and label information corresponding to each of the addresses.

The step of acquiring the information about the mule address group in the method for detecting a scam address of cryptocurrency using a machine learning model comprises: acquiring flow of cryptocurrency related to a first scam address included in the scam address group on the basis of the information about the scam address group; and determining, as the mule address group, a group of addresses through which cryptocurrency is transmitted from the first scam address to a second scam address included in the scam address group or a scam address group different from the scam address group.

The step of acquiring the feature information in the method for detecting a scam address of cryptocurrency using a machine learning model according to the present disclosure comprises acquiring first feature information representing the time from the first transaction to the last transaction of the benign address or a target address included in the scam address group on the basis of the information about the benign addresses, the information about the scam address group, and the information about the mule address group.

The step of acquiring the feature information in the method for detecting a scam address of cryptocurrency using a machine learning model according to the present disclosure comprises acquiring second feature information representing average of the time from receiving cryptocurrency of the benign addresses or a target address included in the scam address group to transmitting the cryptocurrency.

The step of acquiring the feature information in the method for detecting a scam address of cryptocurrency using a machine learning model according to the present disclosure comprises: acquiring first address number information representing the number of departure addresses of transmitting cryptocurrency in first transactions in which cryptocurrency is received at the benign addresses or a target address included in the scam address group per the number of the first transactions; acquiring second address number information representing the number of destination addresses of receiving cryptocurrency in the first transactions per the number of first transactions; acquiring third address number information representing the number of departure addresses of transmitting cryptocurrency in second transactions in which cryptocurrency is transmitted from the target address per the number of second transactions; acquiring fourth address number information representing the number of destination addresses of receiving cryptocurrency in the second transactions per the number of second transactions; and determining the first address number information, the second address number information, the third address number information, and the fourth address number information as third feature information.

The step of acquiring the feature information in the method for detecting a scam address of cryptocurrency using a machine learning model according to the present disclosure comprises: acquiring first ratio information representing a ratio of cryptocurrency directly received from an address group including a target address with respect to the entire cryptocurrency received at the benign addresses or the target address included in the scam address group; acquiring second ratio information representing a ratio of cryptocurrency directly received from a cryptocurrency transaction service with respect to the entire cryptocurrency received at the target address; acquiring third ratio information representing a ratio of cryptocurrency directly received from first address a included in the scam address group with respect to the entire cryptocurrency received at the target address; acquiring fourth ratio information representing a ratio of cryptocurrency directly received from a second address included in the mule address group with respect to the entire cryptocurrency received at the target address; and determining the first ratio information, the second ratio information, the third ratio information, and the fourth ratio information as fourth feature information.

The step of acquiring the feature information in the method for detecting a scam address of cryptocurrency using a machine learning model according to the present disclosure comprises: acquiring fifth ratio information representing a ratio of cryptocurrency directly transmitted to an address group including a target address with respect to the entire cryptocurrency transmitted from the benign addresses or the target address included in the scam address group; acquiring sixth ratio information representing a ratio of cryptocurrency directly transmitted to a cryptocurrency transaction service with respect to the entire cryptocurrency transmitted from the target address; acquiring seventh ratio information representing a ratio of cryptocurrency directly transmitted to a first address included in the scam address group with respect to the entire cryptocurrency transmitted from the target address; acquiring eighth ratio information representing a ratio of cryptocurrency directly transmitted to a second address included in the mule address group with respect to the entire cryptocurrency received at the target address; and determining the fifth ratio information, the sixth ratio information, the seventh ratio information, and the eighth ratio information as fifth feature information.

The step of acquiring the feature information in the method for detecting a scam address of cryptocurrency using a machine learning model according to the present disclosure comprises: acquiring ninth ratio information representing a ratio of cryptocurrency indirectly transmitted to a cryptocurrency transaction service with respect to the entire cryptocurrency transmitted from the benign addresses or a target address included in the scam address group; acquiring tenth ratio information representing a ratio of cryptocurrency indirectly transmitted to a first address included in the scam address group with respect to the entire cryptocurrency transmitted from the target address; acquiring eleventh ratio information representing a ratio of cryptocurrency indirectly transmitted to a second address included in the mule address group with respect to the entire cryptocurrency received at the target address; and determining the ninth ratio information, the tenth ratio information, and the eleventh ratio information as sixth feature information.

The method for detecting a scam address of cryptocurrency using a machine learning model according to the present disclosure further comprises: acquiring a new cryptocurrency address; acquiring new feature information about the new cryptocurrency address; and determining whether the new cryptocurrency address is a scam address by applying the new feature information to the machine learning model.

The method for detecting a scam address of cryptocurrency using a machine learning model according to the present disclosure further comprises: determining, when the new cryptocurrency address is included in the scam address group, a scam risk of the new cryptocurrency address as 5; determining, when the new cryptocurrency address directly transacts cryptocurrency with a first address included in the scam address group, a scam risk of the new cryptocurrency address as 4; determining, when the new cryptocurrency address indirectly transacts cryptocurrency with a first address included in the scam address group, a scam risk of the new cryptocurrency address as 3; determining, when the new cryptocurrency address is determined as a scam address on the basis of the machine learning model, a scam risk of the new cryptocurrency address as 2; determining, when the new cryptocurrency address has no transaction history, a scam risk of the new cryptocurrency address as 1; and determining, when a risk is not classified as 1 to 5, a scam risk of the new cryptocurrency address as 0.

In addition, a program for implementing the method for detecting a scam address as described above may be recorded on a computer-readable recording medium.

DESCRIPTION OF EMBODIMENTS

Figure 1:
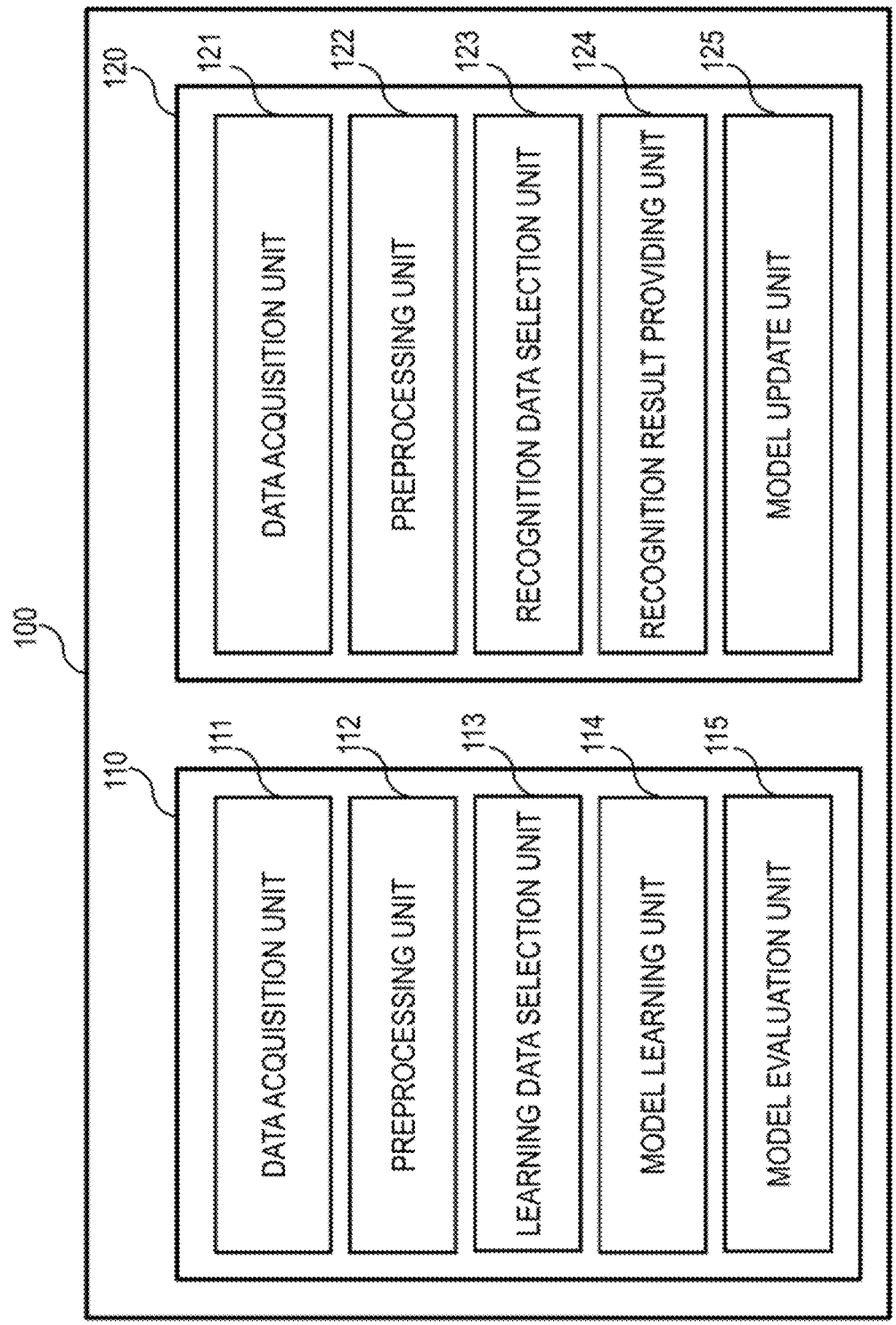
FIG. 1 is a block diagram illustrating a scam address detection apparatus according to an embodiment of the present disclosure.

Advantages and features of the disclosed embodiments, and methods of achieving them, will become apparent with reference to the embodiments described below in conjunction with the accompanying drawings. However, the present disclosure is not limited to the embodiments disclosed below, but may be implemented in various different forms, and only the present embodiments allow the present disclosure to be complete and are only provided to those of ordinary skill in the art to which the present disclosure pertains to fully inform the person of the scope of the invention.

Terms used in the specification will be briefly described, and the disclosed embodiments will be described in detail.

The terms used in this specification have been selected as currently widely used general terms as possible while considering the functions in the present disclosure, but these may vary depending on the intention or precedent of a person skilled in the art, the emergence of new technology, and the like. In addition, in a specific case, there is a term arbitrarily selected by the applicant, and in this case, the meaning will be described in detail in the corresponding description of the invention. Therefore, the terms used in the present disclosure should be defined based on the meaning of the term and the contents of the present disclosure, rather than the simple name of the term.

Singular expressions in the specification include plural expressions unless the context clearly specifies the singular. Also, plural expressions include singular expressions unless the context clearly specifies the plural.

In the entire specification, when a part "includes" a certain element, this means that the part further includes other elements, rather than excluding other elements, unless otherwise stated particularly.

Also, as used in the specification, the term "unit" refers to a software or hardware element, and a "unit" performs certain roles. However, a "unit" is not meant to be limited to software or hardware. The "unit" may be configured to be on an addressable storage medium and may be configured to reproduce one or more processors. Thus, by way of example, a "unit" includes elements such as software elements, object-oriented software elements, class elements, and task elements, processes, functions, properties, procedures, subroutines, segments of program code, drivers, firmware, microcode, circuitry, data, databases, data structures, tables, arrays, and variables. The functionality provided within elements and "units" may be combined into a smaller number of elements and "units" or further divided into additional elements and "units".

According to an embodiment of the present disclosure, a "unit" may be implemented by a processor and a memory. The term "processor" should be interpreted broadly to include a general purpose processor, a central processing unit (CPU), a microprocessor, a digital signal processor (DSP), a controller, a microcontroller, a state machine, and the like. In some circumstances, a "processor" may refer to an application specific semiconductor (ASIC), a programmable logic device (PLD), a field programmable gate array (FPGA), or the like. The term "processor" may refer to a combination of processing devices, such as, for example, a combination of a DSP and a microprocessor, a combination of a plurality of microprocessors, a combination of one or more microprocessors in combination with a DSP core, or any other such configurations.

The term "memory" should be interpreted broadly to include any electronic component capable of storing electronic information. The term "memory" may refer to various types of processor-readable media such as a random access memory (RAM), a read-only memory (ROM), a non-volatile random access memory (NVRAM), a programmable read-only memory (PROM), an erase-programmable read only memory (EPROM), an electrical erasable PROM (EEPROM), a flash memory, a magnetic or optical data storage device, and registers. A memory is said to be in electronic communication with the processor if the processor is capable of reading information from and/or writing information to the memory. A memory integrated in the processor is in electronic communication with the processor.

Hereinafter, with reference to the accompanying drawings, embodiments will be described in detail so that those of ordinary skill in the art to which the present disclosure pertains can easily implement them. In order to clearly describe the present disclosure in the drawings, parts not related to the description will be omitted.

FIG. 1 is a block diagram illustrating a scam address detection apparatus 100 according to an embodiment of the present disclosure.

Referring to FIG. 1, the scam address detection apparatus 100 according to an embodiment may include at least one of a data learning unit 110 and a data recognition unit 120. The learning data acquisition apparatus 100 as described above may include a processor and a memory.

The data learning unit 110 may learn a machine learning model for performing a target task using a data set. The data learning unit 110 may receive a data set and label information related to a target task. The data learning unit 110 may acquire a machine learning model by performing machine learning on the relationship between the data set and the label information. The machine learning model which the data learning unit 110 acquires may be a model for generating label information using a data set.

The data recognition unit 120 may receive and store the machine learning model of the data learning unit 110. The data recognition may output the label information by applying the machine learning model to input data. In addition, the data recognition unit 120 may use the input data, the label information, and the result output by the machine learning model to update the machine learning model.

At least one of the data learning unit 110 and the data recognition unit 120 may be manufactured in the form of at least one hardware chip and mounted in an electronic device. For example, at least one of the data learning unit 110 and the data recognition unit 120 may be manufactured in the form of a dedicated hardware chip for artificial intelligence (AI), or may be manufactured as a part of an existing general-purpose processor (e.g., CPU or application processor) or a dedicated graphics processor (e.g., GPU) and mounted in various kinds of electronic devices described already.

In addition, the data learning unit 110 and the data recognition unit 120 may be mounted in separate electronic devices, respectively. For example, one of the data learning unit 110 and the data recognition unit 120 may be included in an electronic device, and the other may be included in a server. In addition, the data learning unit 110 and the data recognition unit 120 may provide the machine learning model information built by the data learning unit 110 to the data recognition unit 120 by wire or wireless, and the data input to the data recognition unit 120 may be provided as additional learning data to the data learning unit 110.

Meanwhile, at least one of the data learning unit 110 and the data recognition unit 120 may be implemented as a software module. When at least one of the data learning unit 110 and the data recognition unit 120 is implemented as a software module (or a program module including instructions), the software module may be stored in a memory or a non-transitory computer-readable medium. In this case, at least one software module may be provided by an OS (operating system), or provided by a predetermined application. Alternatively, a part of at least one software module may be provided by an OS (operating system), and the other may be provided by a predetermined application.

The data learning unit 110 according to an embodiment of the present disclosure may include a data acquisition unit 111, a preprocessing unit 112, a learning data selection unit 113, a model learning unit 114, and a model evaluation unit 115.

The data acquisition unit 111 may acquire data necessary for machine learning. Since a lot of data is required for learning, the data acquisition unit 111 may receive a data set including a plurality of data.

Label information may be assigned to each of the plurality of data. The label information may be information describing each of the plurality of data. The label information may be information that a target task wants to derive. The label information may be acquired from a user input, may be acquired from a memory, or may be acquired from a result of machine learning model. For example, if the target task is to determine from information related to a transaction history of a cryptocurrency address whether the cryptocurrency address is an address owned by a scammer, a plurality of data used for machine learning may be data related to the transaction history of the cryptocurrency address, and label information may be whether the cryptocurrency address is an address owned by the scammer.

The preprocessing unit 112 may preprocess obtained data so as to use received data for machine learning. The preprocessing unit 112 may process an obtained data set to a preset format so that a model learning unit 114 to be described later can use the data.

The learning data selection unit 113 may select data necessary for learning from the preprocessed data. The selected data may be provided to the model learning unit 114. The learning data selection unit 113 may select data necessary for learning from the preprocessed data in accordance with a preset criterion. In addition, the learning data selection unit 113 may select data in accordance with a preset criterion by learning of the model learning unit 114 to be described later.

The model learning unit 114 may learn a criterion regarding which label information to output on the basis of the data set. In addition, the model learning unit 114 may perform machine learning using the data set and the label information about the data set as learning data. In addition, the model learning unit 114 may perform machine learning by additionally using the previously acquired machine learning model. In this case, the previously acquired machine learning model may be a previously built model. For example, the machine learning model may be a model previously built by receiving basic learning data.

The machine learning model may be built in consideration of the field of application of the learning model, the purpose of learning, the computer performance of the device, and the like. The machine learning model may be, for example, a model based on a neural network. For example, a model such as Deep Neural Network (DNN), Recurrent Neural Network (RNN), Long Short-Term Memory models (LSTM), Bidirectional Recurrent Deep Neural Network (BRDNN), Convolutional Neural Networks (CNN) may be used as a machine learning model, but the invention is not limited thereto.

According to various embodiments, when there are a plurality of previously built machine learning model, the model learning unit 114 may determine a machine learning model with a large correlation between the input learning data and the basic learning data as a machine learning model to learn. In this case, the basic learning data may be pre-classified by data type, and the machine learning model may be previously built by data type. For example, the basic learning data may be pre-classified according to various criteria such as the place where the learning data is generated, the time when the learning data is generated, the size of the learning data, the creator of the learning data, and the type of object in the learning data.

In addition, the model learning unit 114 may train the machine learning model using, for example, a learning algorithm including error back-propagation or gradient descent.

In addition, the model learning unit 114 may learn the machine learning model through, for example, supervised learning with learning data as input values. In addition, the model learning unit 114 may acquire the machine learning model through, for example, unsupervised learning to discover a criterion for a target task by learning kinds of data necessary for a target task by itself without any supervision. In addition, the model learning unit 114 may learn the machine learning model through, for example, reinforcement learning using feedback on whether a result of a target task based on learning is correct.

In addition, when the machine learning model is learned, the model learning unit 114 may store the learned machine learning model. In this case, the model learning unit 114 may store the learned machine learning model in a memory of an electronic device including the data recognition unit 120. Alternatively, the model learning unit 114 may store the learned machine learning model in a memory of a server connected to an electronic device through a wired or wireless network.

The memory in which the learned machine learning model is stored may also store, for example, commands or data related to at least one other element of an electronic device together. In addition, the memory may store software and/or program. The program may include, for example, kernel, middleware, application programming interface (API) and/or application program (or "application"), and the like.

The model evaluation unit 115 inputs evaluation data to the machine learning model, and may allow the model learning unit 114 to learn again when a result output from the evaluation data does not satisfy a predetermined criterion. In this case, the evaluation data may be a preset data for evaluating the machine learning model.

For example, the model evaluation unit 115 may evaluate as not satisfying a predetermined criterion when, among the result of the learned machine learning model for the evaluation data, the number or ratio of evaluation data for which a recognition result is not accurate exceeds a preset threshold value. For example, when the predetermined ratio is defined as 2% and the learned machine learning model outputs incorrect recognition results for more than 20 evaluation data out of a total of 1000 evaluation data, the model evaluation unit 115 may evaluate that the learned machine learning model is not suitable.

Meanwhile, when there are a plurality of learned machine learning models, the model evaluation unit 115 evaluates whether each learned machine learning model satisfies a predetermined criterion, and may determine a model satisfying the predetermined criterion as a final machine learning model. In this case, when there are a plurality of models satisfying the predetermined criterion, the model evaluation unit 115 may determine any preset one or a predetermined number of models in order of highest evaluation score as a final machine learning model.

Meanwhile, at least one of the data acquisition unit 111, the preprocessing unit 112, the learning data selection unit 113, the model learning unit 114, and the model evaluation unit 115 in the data learning unit 110 may be manufactured in the form of at least one hardware chip and mounted in an electronic device. For example, at least one of the data acquisition unit 111, the preprocessing unit 112, the learning data selection unit 113, the model learning unit 114, and the model evaluation unit 115 may be manufactured in the form of a dedicated hardware chip for artificial intelligence (AI), or may be manufactured as a part of an existing general-purpose processor (e.g., CPU or application processor) or a dedicated graphics processor (e.g., GPU) and mounted in various kinds of electronic devices described above.

In addition, the data acquisition unit 111, the preprocessing unit 112, the learning data selection unit 113, the model learning unit 114, and the model evaluation unit 115 may be mounted in one electronic device, or mounted in separate electronic device, respectively. For example, a part of the data acquisition unit 111, the preprocessing unit 112, the learning data selection unit 113, the model learning unit 114, and the model evaluation unit 115 may be included in an electronic device, and the other may be included in a server.

In addition, at least one of the data acquisition unit 111, the preprocessing unit 112, the learning data selection unit 113, the model learning unit 114, and the model evaluation unit 115 may be implemented as a software module. When at least one of the data acquisition unit 111, the preprocessing unit 112, the learning data selection unit 113, the model learning unit 114, and the model evaluation unit 115 is implemented as a software module (or a program module including instructions), the software module may be stored in a non-transitory computer-readable medium. In this case, at least one software module may be provided by an OS (operating system), or provided by a predetermined application. Alternatively, a part of at least one software module may be provided by an OS (operating system), and the other may be provided by a predetermined application.

The data recognition unit 120 according to an embodiment of the present disclosure may include a data acquisition unit 121, a preprocessing unit 122, a recognition data selection unit 123, a recognition result providing unit 124, and a model update unit 125.

The data acquisition unit 121 may receive input data. The preprocessing unit 122 may preprocess the acquired input data so as to use the acquired input data in the recognition data selection unit 123 or the recognition result providing unit 124.

The recognition data selection unit 123 may select necessary data from preprocessed data. The selected data may be provided to the recognition result providing unit 124. The recognition data selection unit 123 may select a part or all of the preprocessed data in accordance with a preset criterion. In addition, the recognition data selection unit 123 may select data in accordance with a preset criterion by learning of the model learning unit 114.

The recognition result providing unit 124 may acquire result data by applying the selected data to a machine learning model. The machine learning model may be a machine learning model generated by the model learning unit 114. The recognition result providing unit 124 may output result data.

The model update unit 125 may update the machine learning model on the basis of evaluation about the recognition result provided by the recognition result providing unit 124. For example, the model update unit 125 may provide the recognition result provided by the recognition result providing unit 124 to the model learning unit 114 so that the model learning unit 114 updates the machine learning model.

Meanwhile, at least one of the data acquisition unit 121, the preprocessing unit 122, the recognition data selection unit 123, the recognition result providing unit 124, and the model update unit 125 in the data recognition unit 120 may be manufactured in the form of at least one hardware chip and mounted in an electronic device. For example, at least one of the data acquisition unit 121, the preprocessing unit 122, the recognition data selection unit 123, the recognition result providing unit 124, and the model update unit 125 may be manufactured in the form of a dedicated hardware chip for artificial intelligence (AI), or may be manufactured as a part of an existing general-purpose processor (e.g., CPU or application processor) or a dedicated graphics processor (e.g., GPU) and mounted in various kinds of electronic devices described above.

In addition, the data acquisition unit 121, the preprocessing unit 122, the recognition data selection unit 123, the recognition result providing unit 124, and the model update unit 125 may be mounted in one electronic device, or mounted in separate electronic device, respectively. For example, a part of the data acquisition unit 121, the preprocessing unit 122, the recognition data selection unit 123, the recognition result providing unit 124, and the model update unit 125 may be included in an electronic device, and the other may be included in a server.

In addition, at least one of the data acquisition unit 121, the preprocessing unit 122, the recognition data selection unit 123, the recognition result providing unit 124, and the model update unit 125 may be implemented as a software module. When at least one of the data acquisition unit 121, the preprocessing unit 122, the recognition data selection unit 123, the recognition result providing unit 124, and the model update unit 125 is implemented as a software module (or a program module including instructions), the software module may be stored in a non-transitory computer-readable medium. In this case, at least one software module may be provided by an OS (operating system), or provided by a predetermined application. Alternatively, a part of at least one software module may be provided by an OS (operating system), and the other may be provided by a predetermined application.

Hereinafter, a method and apparatus in which the data acquisition unit 111, the preprocessing unit 112, and the learning data selection unit 113 of the data learning unit 110 receives and processes learning data will be described in more detail.

Figure 2:
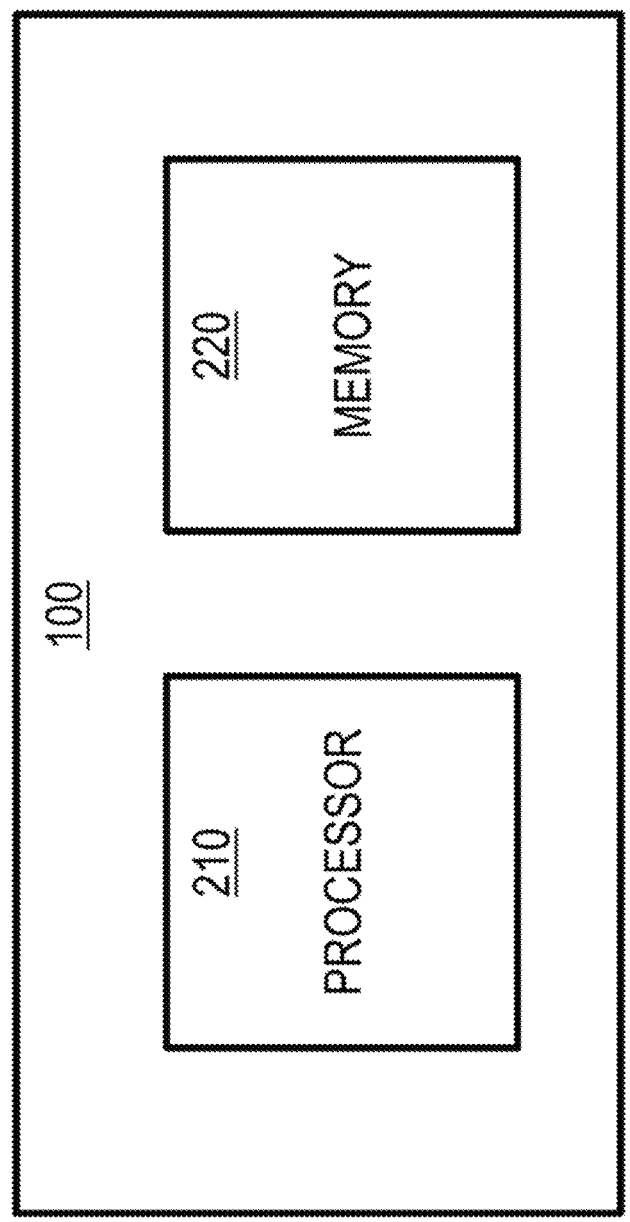
FIG. 2 is a diagram illustrating a scam address detection apparatus according to an embodiment of the present disclosure.

FIG. 2 is a diagram illustrating a scam address detection apparatus according to an embodiment of the present disclosure.

A scam address detection apparatus 100 may include a processor 210 and a memory 220. The processor 210 may perform commands stored in the memory 220.

As described above, the scam address detection apparatus 100 may include the data learning unit 110 and a data recognition unit 120. The data learning unit 110 or the data recognition unit 120 may be implemented by the processor 210 and the memory 220.

Figure 3:
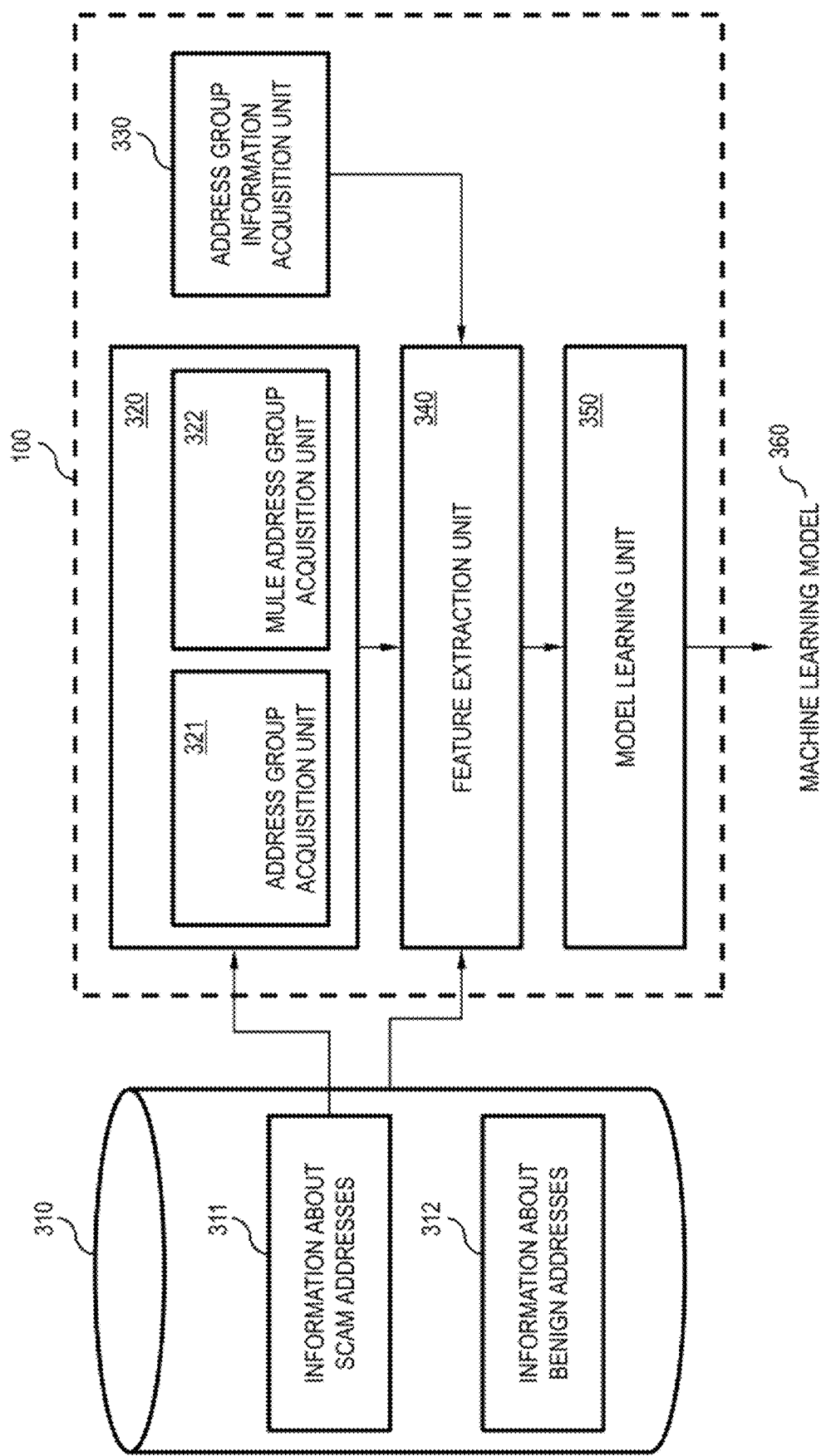
FIG. 3 is a block diagram illustrating a scam address detection apparatus according to an embodiment of the present disclosure.
Figure 4:
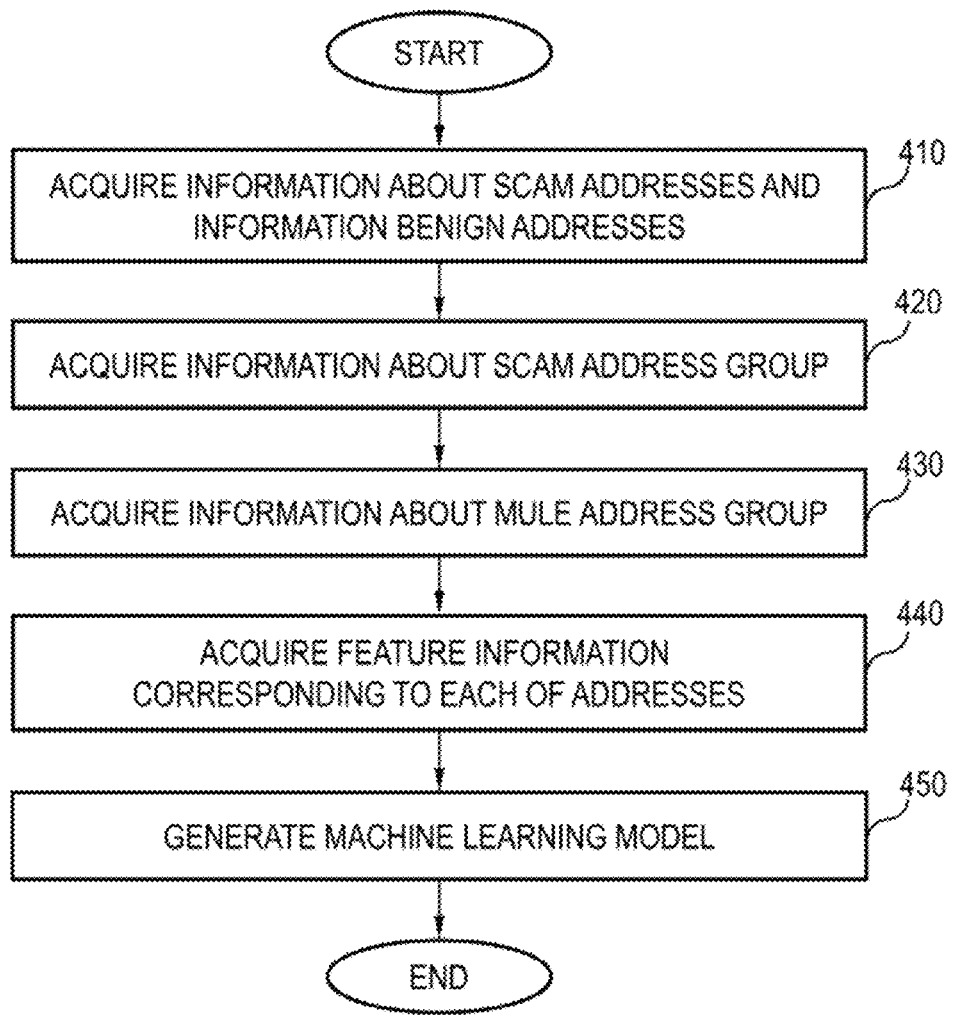
FIG. 4 is a flowchart illustrating an operation of a scam address detection apparatus according to an embodiment of the present disclosure.

FIG. 3 is a block diagram illustrating a scam address detection apparatus according to an embodiment of the present disclosure. In addition, FIG. 4 is a flowchart illustrating an operation of a scam address detection apparatus according to an embodiment of the present disclosure.

The processor 210 of the scam address detection apparatus 100 may execute the following steps to detect a scam address of cryptocurrency using machine learning on the basis of commands stored in the memory 220.

The scam address detection apparatus 100 may execute Step 410 of acquiring information 311 about scam addresses labeled as being used for a scam transaction and information 312 about benign addresses labeled as being used for a normal transaction from a database 310.

The database 310 may store the information 311 about scam addresses and the information 312 about benign addresses. The information about scam addresses and the information about benign addresses may be stored in the database 310 on the basis of the data acquisition unit 111, the preprocessing unit 112, or the learning data selection unit 113 of the scam address detection apparatus 100.

The database 310 may be included in the scam address detection apparatus 100. In addition, the database 310 may be provided outside the scam address detection apparatus 100. The scam address detection apparatus 100 may acquire information from the database 310 using wired or wireless communication.

The information 311 about scam addresses and the information 312 about the benign addresses may include addresses and transaction histories of scam addresses and benign addresses. In addition, the information 311 about scam addresses and the information 312 about the benign addresses may mean label information about scam addresses and benign addresses. The label information included in the information about scam addresses and the information about benign addresses may represent 'scam' or 'benign'.

The scam address detection apparatus 100 may execute Step 420 of acquiring information about a scam address group (scam cluster) determined as being owned by the same user on the basis of the information 311 about scam addresses.

The scam address detection apparatus 100 may include an address group acquisition unit 320. The address group acquisition unit 320 may further extract addresses owned by the same user on the basis of a transaction history of the already acquired addresses, and perform clustering or grouping of the addresses owned by the same user.

The address group acquisition unit 320 may include a scam address group acquisition unit 321 and a mule address group acquisition unit 322.

The scam address group acquisition unit 321 may group scam addresses determined as being owned by the same user on the basis of the information 311 about scam addresses included in the database 310. For example, the scam address detection apparatus 100 may use multi-input heuristic algorithm of grouping a set of transmission addresses according to whether or not they have a private key corresponding to a cryptocurrency address used as a transmission address of a transaction to group cryptocurrency addresses. Alternatively, the scam address detection apparatus 100 may use address change heuristic algorithm of grouping a plurality of addresses presumed to be owned by the same owner using an address where a balance is returned after remittance. In addition, the scam address detection apparatus 100 may use heuristic algorithm defined by a user. In addition, the scam address detection apparatus 100 may perform address filtering and/or address grouping by user command.

The mule address group acquisition unit 322 of the scam address detection apparatus 100 may execute Step 430 of acquiring information about a mule address group (mule cluster) used for money laundering on the basis of a scam address group. The method of acquiring information about a mule address group will be described in more detail with reference to FIG. 5. The information about the mule address group may include a transaction history of an address included in the mule address group or an address. In addition, the information about the mule address group may include label information. For example, the label information may represent 'mule'.

The scam address detection apparatus 100 may further include an address group information acquisition unit 330. The address group information acquisition unit 330 may acquire information about a service address group. A service address may mean an address of a cryptocurrency exchange. For example, the address group information acquisition unit 330 may acquire information about a service address group from "walletExplorer.com".

*86

A feature extraction unit 340 of the scam address detection apparatus 100 may execute Step 440 of acquiring feature information corresponding to each of benign addresses or addresses included in a scam address group on the basis of at least one of the information about benign addresses, the information about a scam address group, and the information about a mule address group. The feature information may be acquired on the basis of a transaction history included in the information about benign addresses, the information about a scam address group, or the information about a mule address group. The feature information will be described in more detail with reference to FIG. 8.

A model learning unit 350 of the scam address detection apparatus 100 may execute Step 450 of generating a machine learning model 360 by machine learning of feature information corresponding to each of address and label information corresponding to each of addresses.

The scam address detection apparatus 100 may store the learned machine learning model 360 in a memory. In addition, the scam address detection apparatus 100 may transmit the machine learning model 360 to another scam address detection apparatus 100.

Figure 5:
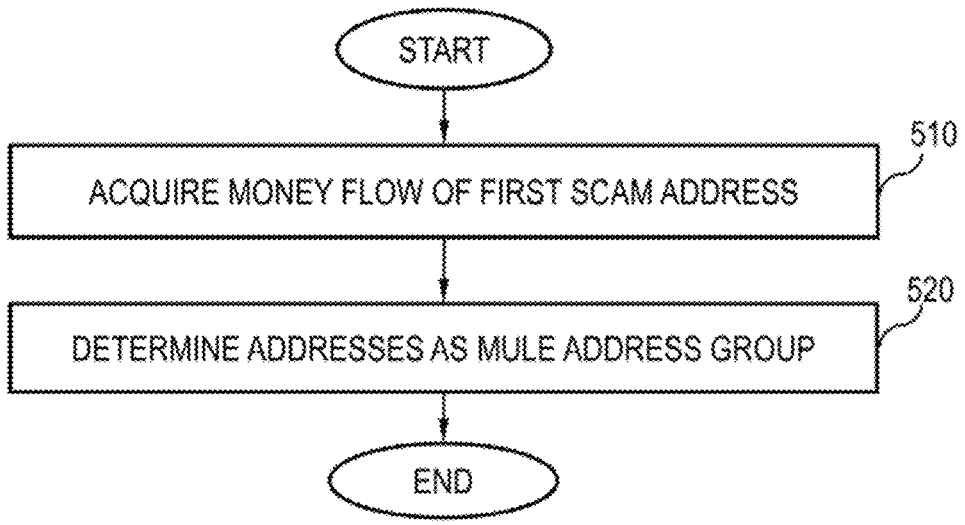
FIG. 5 is a flowchart illustrating a method of acquiring information about a mule address group according to an embodiment of the present disclosure.
Figure 6:
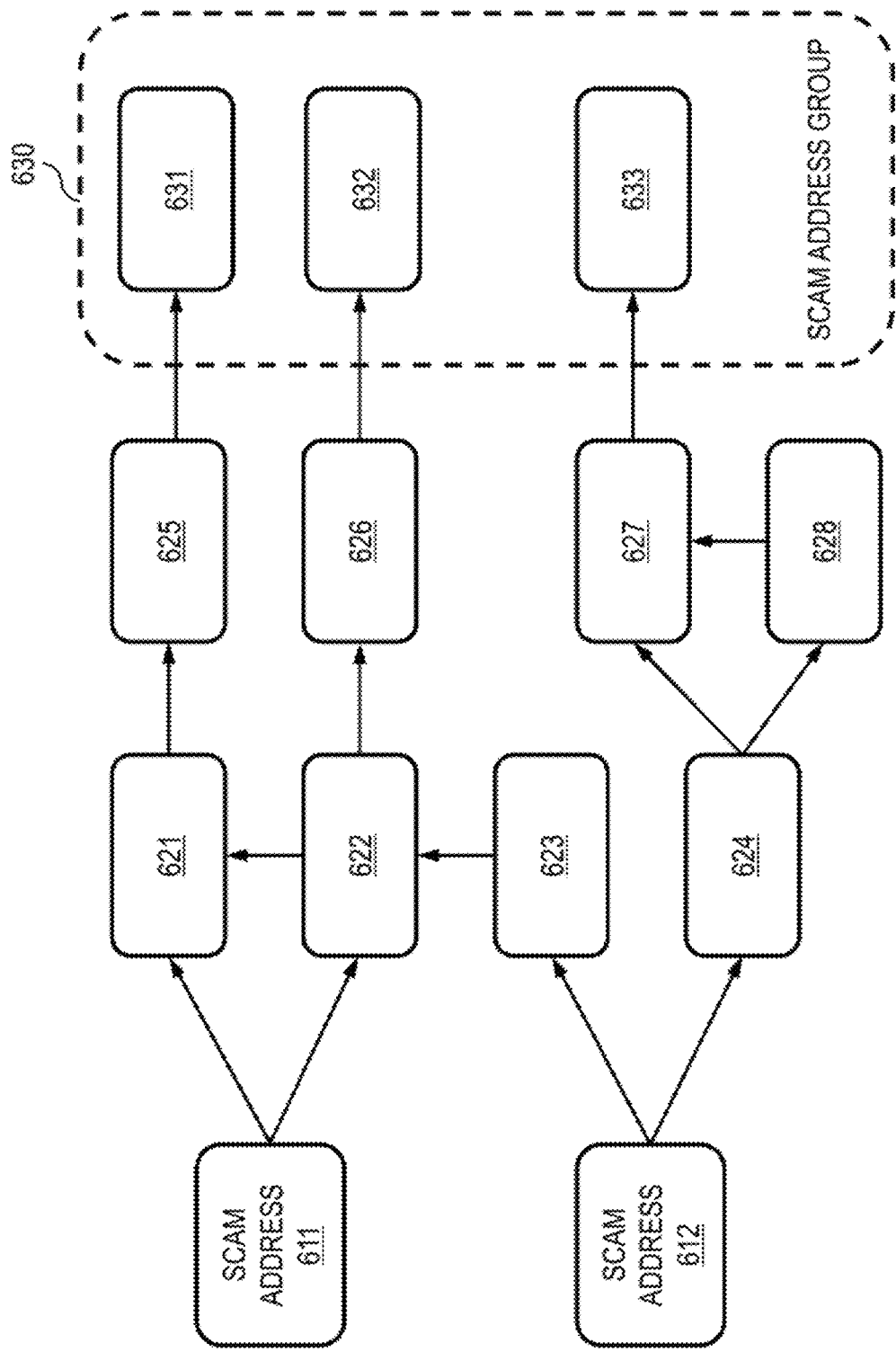
FIG. 6 is a flowchart illustrating a process of acquiring information about a mule address group according to an embodiment of the present disclosure.
Figure 7:
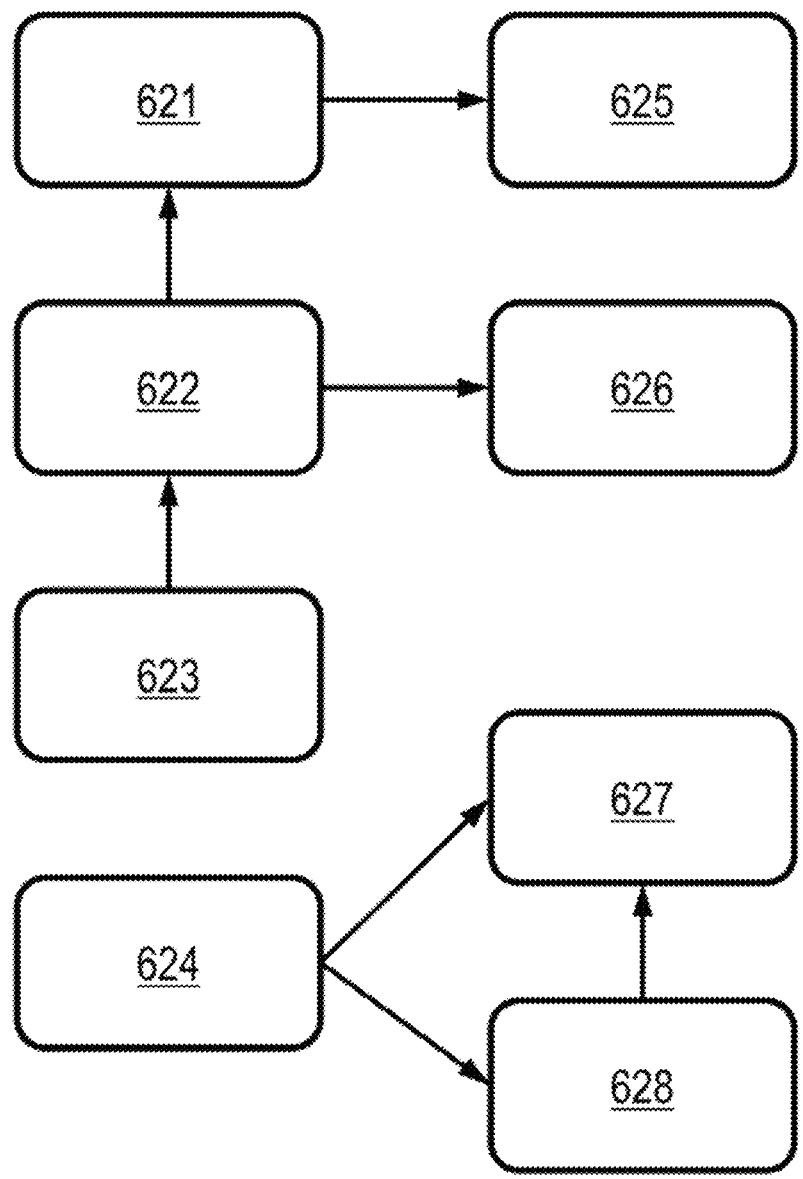
FIG. 7 is a flowchart illustrating a process of acquiring information about a mule address group according to an embodiment of the present disclosure.
Figure 8:
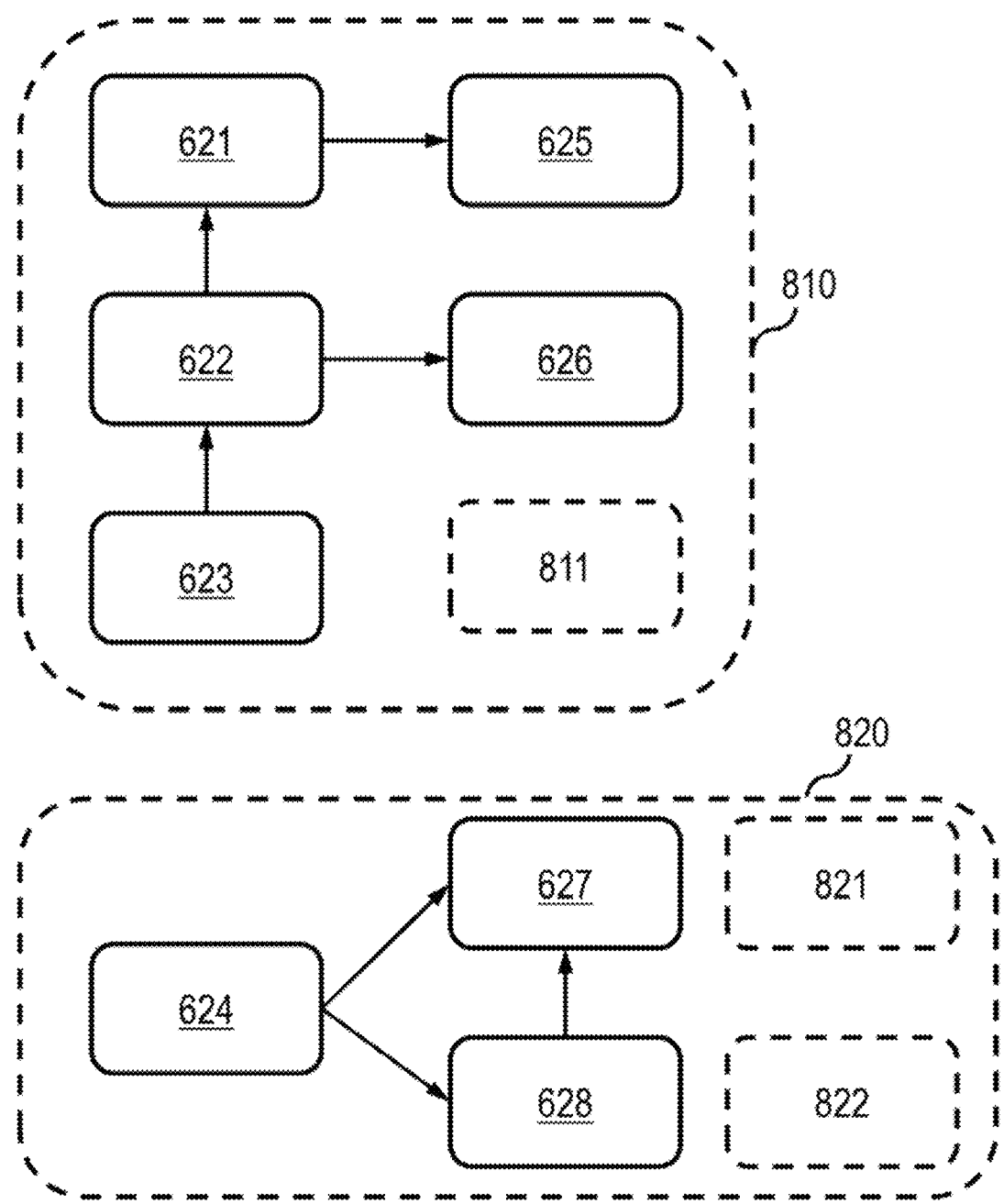
FIG. 8 is a flowchart illustrating a process of acquiring information about a mule address group according to an embodiment of the present disclosure.

FIG. 5 is a flowchart illustrating a method of acquiring information about a mule address group according to an embodiment of the present disclosure. FIG. 6 to FIG. 8 are flowcharts illustrating a process of acquiring information about a mule address group according to an embodiment of the present disclosure.

The mule address group acquisition unit 322 of the scam address detection apparatus 100 may execute Step 510 of acquiring flow of cryptocurrency related to a first scam address included in the scam address group on the basis of the information 311 about a scam address group.

Referring to FIG. 6, the scam address detection apparatus 100 may acquire flow of cryptocurrency related to a first scam address 611 from the database 310. The scam address detection apparatus 100 may acquire flow of transmission of cryptocurrency from the first scam address 611 to addresses 621, 622, 625, and 626.

The scam address detection apparatus 100 may execute Step 520 of determining, as the mule address group, a group of addresses through which cryptocurrency is transmitted from the first scam address 611 to a second scam address included in the scam address group or a scam address group different from the scam address group.

Statistically, there are many cases in which a scam address transacts cryptocurrency with a scam address through a mule address. In addition, there are overwhelmingly many cases in which a benign address transacts cryptocurrency with benign addresses. Accordingly, the scam address detection apparatus 100 may determine an intermediate address included between scam addresses as a mule address.

When cryptocurrency is transmitted from the first scam address 611 to one of benign address through intermediate the addresses, scam address detection apparatus 100 may reserve to determine the intermediate addresses as mule addresses. In other words, the scam address detection apparatus 100 may determine intermediate addresses that carry cryptocurrency in a transaction between scam address sides as a mule address, and may reserve to determine an intermediate address included in a transaction between a scam address and a benign address.

The scam address detection apparatus 100 may track a transaction history from the first scam address 611 to addresses 631, 632, and 633 included in a scam address group 630 until cryptocurrency arrives. The scam address group 630 may be a scam address group 630 including the first scam address 611. However, the invention is not limited thereto, and the scam address group 630 may be another scam address group not including the first scam address 611 but determined as a scam address group.

The scam address detection apparatus 100 may acquire addresses 621, 625, 622, and 626 through which cryptocurrency arrives from the first scam address 611 to addresses 631, 632, and 633 included in the scam address group 630, as mule addresses. In addition, the scam address detection apparatus 100 may acquire addresses 623, 624, 627, and 628 through which cryptocurrency arrives from another scam address 612 other than the first scam address 611 to the addresses 631, 632, and 633 included in the scam address group 630, as mule addresses. The scam address detection apparatus 100 may repeat such a process with respect to all addresses included in the scam address group 630.

Referring to FIG. 7, the scam address detection apparatus 100 may acquire addresses 621, 622, 623, 624, 625, 626, 627, and 628 as mule addresses by repeating such a process. The scam address detection apparatus 100 may classify address groups on the basis of transaction histories of the addresses 621, 622, 623, 624, 625, 626, 627, and 628. For example, the first address groups 621, 622, 623, 625, and 626 and the second address groups 624, 627, and 628 may have no history of a transaction with each other. The scam address detection apparatus 100 may group the first address group and the second address group to groups different from each other. The scam address detection apparatus 100 may determine the first address group as a first mule address group and determine the second address group as a second mule address group.

Referring to FIG. 8, the scam address detection apparatus 100 may additionally detect an address 811 owned by the same user on the basis of information about the addresses 621, 622, 623, 625, and 626 included in a first mule address group 810. For example, the scam address detection apparatus 100 may use multi-input heuristic algorithm of grouping a set of transmission addresses according to whether or not they have a private key corresponding to a cryptocurrency address used as a transmission address of a transaction to group cryptocurrency addresses. Alternatively, the scam address detection apparatus 100 may use address change heuristic algorithm of grouping a plurality of addresses presumed to be owned by the same owner using an address where a balance is returned after remittance. In addition, the scam address detection apparatus 100 may use heuristic algorithm defined by a user. In addition, the scam address detection apparatus 100 may perform address filtering and/or address grouping by user command.

The scam address detection apparatus 100 may additionally detect addresses 821 and 822 owned by the same user on the basis of information about addresses 624, 627, and 628 included in a second mule address group 820.

Figure 9:
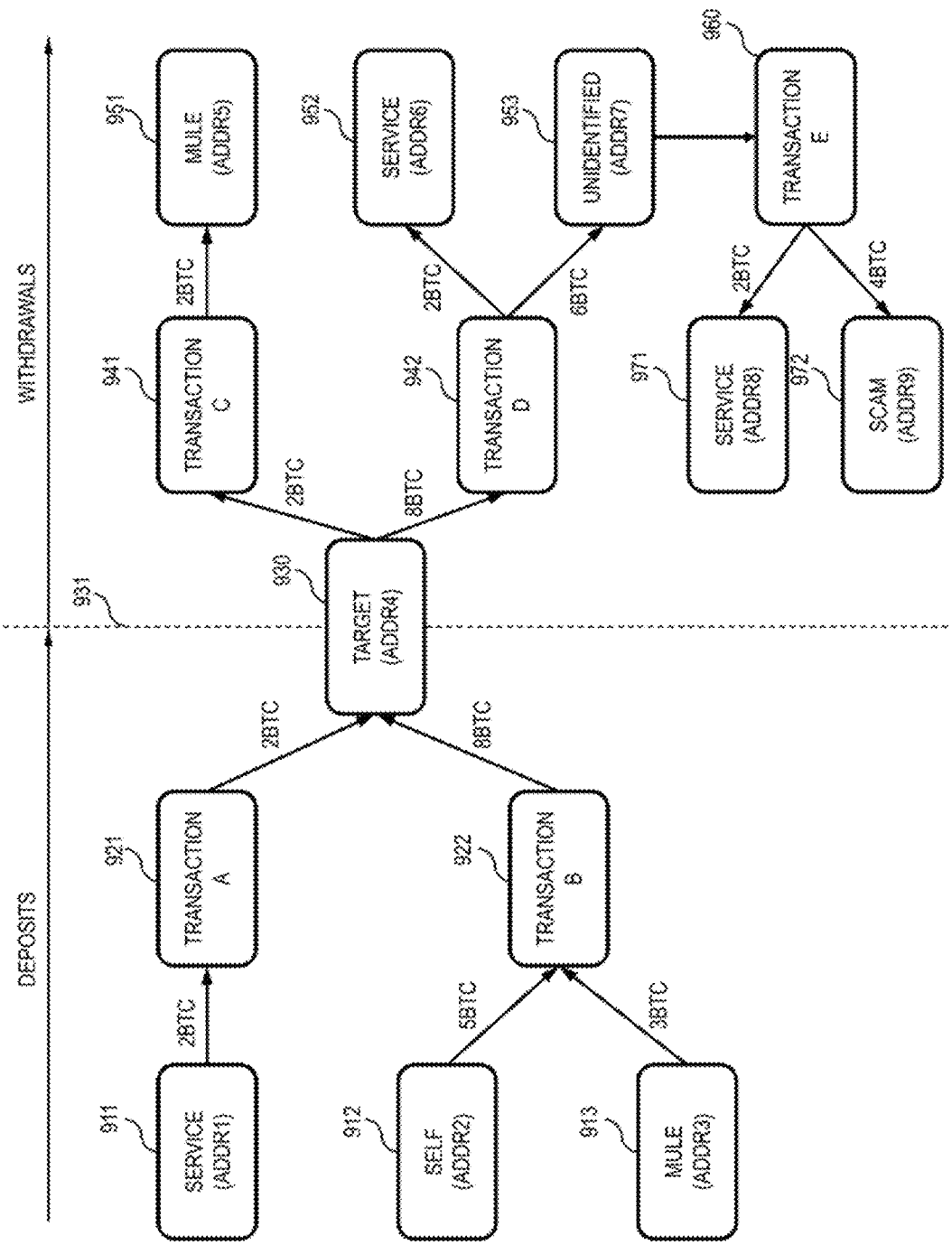
FIG. 9 is a diagram illustrating a process of acquiring feature information according to an embodiment of the present disclosure.

FIG. 9 is a diagram illustrating a process of acquiring feature information according to an embodiment of the present disclosure.

The scam address detection apparatus 100 may execute Step 440 of acquiring feature information corresponding to each of benign addresses or addresses included in a scam address group on the basis of at least one of the information about benign addresses, the information about a scam address group, and the information about a mule address group. The scam address detection apparatus 100 may acquire a transaction history of a target address 930 on the basis of at least one of the information about benign addresses, the information about a scam address group, and the information about a mule address group. The target address 930 may be an ADDR4.

Referring to FIG. 9, the left of a line 931 may represent a transaction history of receiving cryptocurrency at the target address 930, and the right may represent a transaction history of transmitting cryptocurrency at the target address 930.

For convenience of explanation in FIG. 9, BTC was used as the unit of cryptocurrency. This may be a unit of Bitcoin, which is a type of cryptocurrency. However, the present disclosure is not limited to Bitcoin, and the same description may be applied to other cryptocurrency.

The target address 930 may receive cryptocurrency of 2 BTC from an ADDR1 911 which is a service address by Transaction A 921. Herein, the service address may mean an address of an exchange.

The target address 930 may receive cryptocurrency of 5 BTC from an ADDR2 912 which is an address of the same owner as an owner of the target address 930 by Transaction B 922. At the same time, the target address 930 may receive cryptocurrency of 3 BTC from an ADDR3 913 which is a mule address by Transaction B 922. In other words, the target address 930 may receive cryptocurrency of 8 BTC by Transaction B 922.

The target address 930 may transmit cryptocurrency of 2 BTC to an ADDR5 951 which is a mule address by Transaction C 941.

The target address 930 may transmit cryptocurrency of 2 BTC to an ADDR6 952 which is a service address by Transaction D 942. At the same time, the target address 930 may transmit cryptocurrency of 6 BTC to an ADDR7 953 which is an unspecified address by Transaction D 942. The unspecified address may be an address which is not determined as benign addresses, a scam address group, a mule address group, or a service address group by the scam address detection apparatus 100. The target address 930 may transmit cryptocurrency of 8 BTC by Transaction D 942.

The scam address detection apparatus 100 may acquire feature information including first feature information.

The scam address detection apparatus 100 may execute acquiring first feature information representing the time from the first transaction to the last transaction of a target address 930 included in the benign address or the scam address group on the basis of the information about the benign addresses, the information about the scam address group, and the information about the mule address group.

For example, the scam address detection apparatus 100 may acquire a transaction history such as Transaction A 921, Transaction B 922, Transaction C 941, and Transaction D 942 on the basis of information about the target address 930.

Transaction A 921 might be made on Feb. 1, 2019, Transaction B 922 might be made on Mar. 1, 2019, Transaction C 941 might be made on May 1, 2019, and Transaction D 942 might be made on Apr. 1, 2019. The scam address detection apparatus 100 may determine the first transaction of the target address 930 as Transaction A 921. In addition, the scam address detection apparatus 100 may determine the last transaction of the target address 930 as Transaction C 941. In addition, the scam address detection apparatus 100 may determine the time from the first transaction to the last transaction as 89 days. The scam address detection apparatus 100 may acquire information representing 89 days as the first feature information of the target address 930.

The first feature information of scam addresses tends to be shorter than the first feature of benign addresses. Accordingly, the scam address detection apparatus 100 may determine whether a new address is a scam address on the basis of the first feature information.

The scam address detection apparatus 100 may acquire feature information including second feature information.

The scam address detection apparatus 100 may execute acquiring second feature information representing an average of the time from receiving cryptocurrency of the target address included in the benign addresses or the scam address group to transmitting the cryptocurrency.

For example, 2 BTC received from Transaction A 921 at the target address 930 may be transmitted from the target address 930 by Transaction C 941. The time between Transaction A 921 and Transaction C 941 may be 89 days. In addition, 8 BTC received from Transaction B 922 at the target address 930 may be transmitted from the target address 930 by Transaction D 942. The time between Transaction B 922 and Transaction D 942 may be 31 days. Accordingly, the average of the time from receiving cryptocurrency of the target address to transmitting the cryptocurrency may be $(31+89)/2=60$ days. The scam address detection apparatus 100 may acquire information representing 60 days as the second feature information of the target address 930.

The second feature information of scam addresses tends to be shorter than the second feature of benign addresses. Accordingly, the scam address detection apparatus 100 may determine whether a new address is a scam address on the basis of the second feature information.

The scam address detection apparatus 100 may acquire feature information including third feature information.

The scam address detection apparatus 100 may execute acquiring first address number information representing the number of departure addresses 911, 912, and 913 of transmitting cryptocurrency in first transactions in which cryptocurrency is received at the target address 930 included in the benign address or the scam address group per the number of the first transactions 921 and 922.

For example, the target address 930 may receive cryptocurrency by two transactions such as Transaction A 921 and Transaction B 922. The departure address of transmitting cryptocurrency in Transaction A 921 may be the ADDR1 911. In addition, the departure addresses of transmitting cryptocurrency in Transaction B 912 may be the ADDR2 912 and the ADDR3 913. The number of transactions of receiving cryptocurrency at the target address 930 may be two, and the number of departure addresses may be three. Accordingly, the scam address detection apparatus 100 may determine the first address number information as $3/2=1.5$.

The scam address detection apparatus 100 may execute acquiring second address number information representing of destination addresses of receiving the number cryptocurrency in first transactions per the number of first transactions.

For example, the target address 930 may receive cryptocurrency by two transactions such as Transaction A 921 and Transaction B 922. The destination address of receiving cryptocurrency in Transaction A 921 may be the target address 930. In addition, the destination address of receiving cryptocurrency in Transaction B 922 may be the target address 930. The number of transactions of receiving cryptocurrency at the target address 930 may be two, and the number of destination addresses may be one. Accordingly, the scam address detection apparatus 100 may determine the second address number information as $1/2=0.5$.

The scam address detection apparatus 100 may execute acquiring third address number information representing the number of departure addresses of transmitting cryptocurrency in second transactions in which cryptocurrency is transmitted from the target address per the number of second transactions.

For example, the target address 930 may transmit cryptocurrency by two transactions such as Transaction C 941 and Transaction D 942. The departure address of transmitting cryptocurrency in Transaction C 941 may be the target address 930. In addition, the departure address of transmitting cryptocurrency in Transaction D 942 may be the target address 930. The number of transactions of transmitting cryptocurrency from the target address 930 may be two, and the number of departure addresses may be one. Accordingly, the scam address detection apparatus 100 may determine the third address number information as $1/2=0.5$.

The scam address detection apparatus 100 may execute acquiring fourth address number information representing the number of destination addresses of receiving cryptocurrency in the second transactions per the number of second transactions.

For example, the target address 930 may transmit cryptocurrency by two transactions such as Transaction C 941 and Transaction D 942. The destination address of receiving cryptocurrency in Transaction C 941 may be an ADDR5 951. In addition, the destination address of receiving cryptocurrency in Transaction D 942 may be an ADDR6 952 and ADDR7 953. The number of transactions of transmitting cryptocurrency from the target address 930 may be two, and the number of destination addresses may be three. Accordingly, the scam address detection apparatus 100 may determine the fourth address number information as $3/2=1.5$.

The scam address detection apparatus 100 may execute determining the first address number information, the second address number information, the third address number information, and the fourth address number information as third feature information.

There are many cases in which the number of destinations in a transaction of receiving cryptocurrency at a scam address is equal to or less than a predetermined number. However, there are many cases in which benign addresses perform a many-to-many transaction since the transaction is performed in an exchange. Accordingly, there are many cases in which the number of destinations in a transaction of receiving cryptocurrency at a benign address is equal to or more than a predetermined number.

In addition, cases in which the number of departure points in a transaction of transmitting cryptocurrency from a scam address is more than a predetermined number are more than cases in which the number of departure points for a benign address is more than a predetermined number. This could be because the people who own scam addresses operate many cryptocurrency addresses.

The scam address detection address 100 may acquire feature information including fourth feature information.

The scam address detection apparatus 100 may execute acquiring first ratio information representing a ratio of cryptocurrency directly received from an address group 930 including a target address with respect to the entire cryptocurrency received at the target address 930 included in the benign addresses or the scam address group.

Benign addresses may be one group without distinction of owners. The benign addresses may be referred to as one benign address group. However, the present disclosure is not limited thereto, and the benign addresses may be grouped by owners. The benign addresses grouped by owners may be referred to as a benign address group.

Each of a benign address group, scam address group, and mule address group may include a plurality of address groups. When the target address 930 belongs to the first scam address group, the scam address detection apparatus 100 may acquire a ratio of cryptocurrency directly received from an address included in the first scam address with respect to the entire cryptocurrency received at the target address 930 as first ratio information. The first ratio may be represented as a percentage, a fraction, or a real number.

The target address 930 directly receiving cryptocurrency means that the target address 930 directly receives cryptocurrency from a departure address without going through another address in between. In addition, it means that the target address 930 receives cryptocurrency through only one transaction. Referring to FIG. 9, the target address 930 receives cryptocurrency from the ADDR1 911 through Transaction A 921. In addition, the target address 930 receives cryptocurrency from the ADDR2 912 through Transaction B 922. In addition, the target address 930 receives cryptocurrency from the ADDR3 913 through Transaction B 922. Accordingly, in FIG. 9, the departure addresses of directly receiving cryptocurrency at the target address 930 may be ADDR1 911, ADDR2 912, and ADDR3 913.

Referring to FIG. 9, the entire cryptocurrency received at the target address 930 may be 10 BTC. When the cryptocurrency directly received from the ADDR2 912 which is another address of an address group including the target address 930 is 5 BTC, the first ratio information may be 50%.

The scam address detection apparatus 100 may execute acquiring second ratio information representing a ratio of cryptocurrency directly received from a cryptocurrency transaction service with respect to the entire cryptocurrency received at the target address 930. The cryptocurrency transaction service may mean a cryptocurrency exchange.

For example, referring to FIG. 9, the entire cryptocurrency received at the target address 930 may be 10 BTC. When the cryptocurrency directly received from the ADDR1 911 which is an address of a cryptocurrency transaction service is 2 BTC, the second ratio information may be 20%.

The scam address detection apparatus 100 may execute acquiring third ratio information representing a ratio of cryptocurrency directly received from the first address included in the scam address group with respect to the entire cryptocurrency received at the target address 930.

When the target address 930 is included in the scam address group, the third ratio information may include the first ratio information. Accordingly, when the target address 930 is included in the scam address group at the time of acquiring the third ratio information, the scam address detection apparatus 100 may acquire the third ratio information on the basis of the size of cryptocurrency directly received from the first address included in the scam address group including the target address 930 and another scam address group. However, the present disclosure is not limited thereto. When the target address 930 is included in the scam address group, the scam address detection apparatus 100 may acquire the third ratio information on the basis of the size of cryptocurrency directly received from the first address in the scam address group including the target address 930.

The scam address detection apparatus 100 may execute acquiring fourth ratio information representing a ratio of cryptocurrency directly received from a second address included in a mule address group with respect to the entire cryptocurrency received at the target address 930.

For example, referring to FIG. 9, the entire cryptocurrency received at the target address 930 may be 10 BTC. When the cryptocurrency directly received at the target address 930 from the ADDR3 913 which is the second address included in the mule address group is 3 BTC, the fourth ratio information may be 30%.

The scam address detection apparatus 100 may execute determining the first ratio information, the second ratio information, the third ratio information, and the fourth ratio information as fourth feature information.

The scam address detection apparatus 100 may acquire feature information including fifth feature information.

The scam address detection apparatus 100 may execute acquiring fifth ratio information representing a ratio of cryptocurrency directly transmitted to an address group including the target address 930 with respect to the entire cryptocurrency transmitted from the target address 930 included in the benign addresses or the scam address group.

The target address 930 directly transmitting cryptocurrency means that the target address 930 directly transmits cryptocurrency to a destination address without going through another address in between. In addition, it means that the target address 930 transmits cryptocurrency through only one transaction. Referring to FIG. 9, the target address 930 transmits cryptocurrency to the ADDR5 951 through Transaction C 941. In addition, the target address 930 transmits cryptocurrency to the ADDR6 952 through Transaction D 942. In addition, the target address 930 transmits cryptocurrency to the ADDR7 953 through Transaction D 942. Accordingly, in FIG. 9, the destination addresses directly transmitting cryptocurrency from the target address 930 may be the ADDR5 951, the ADDR6 952, and the ADDR7 953.

The scam address detection apparatus 100 may execute acquiring sixth ratio information representing a ratio of cryptocurrency directly transmitted to a cryptocurrency transaction service to with respect the entire cryptocurrency transmitted from the target address 930.

For example, referring to FIG. 9, the size of the entire cryptocurrency transmitted from the target address 930 may be 10 BTC. In addition, the size of cryptocurrency directly transmitted to the ADDR6 952 which is an address of a cryptocurrency transaction service may be 2 BTC. Accordingly, the scam address detection apparatus 100 may acquire 20% as the sixth ratio information.

The scam address detection apparatus 100 may execute acquiring seventh ratio information representing a ratio of cryptocurrency directly transmitted to a first address included in the scam address group with respect to the entire cryptocurrency transmitted from the target address 930.

Referring to FIG. 9, the target address 930 transmitted cryptocurrency to the ADDR9 972 which is a scam address through Transaction D 942 and Transaction E 960. However, since the target address 930 transmitted cryptocurrency to the ADDR9 972 which is a scam address using two or more transactions, the scam address detection apparatus 100 may determine that the target address 930 did not directly transmit cryptocurrency to the scam address.

The scam address detection apparatus 100 may execute acquiring eighth ratio information representing a ratio of cryptocurrency directly transmitted to a second address included in a mule address group with respect to the entire cryptocurrency received at the target address.

For example, referring to FIG. 9, the size of the entire cryptocurrency transmitted from the target address 930 may be 10 BTC. In addition, the size of cryptocurrency directly transmitted to the ADDR5 951 which is an address included in a mule address group may be 2 BTC. Accordingly, the scam address detection apparatus 100 may acquire 20% as the eighth ratio information.

The scam address detection apparatus 100 may execute determining the fifth ratio information, the sixth ratio information, the seventh ratio information, and the eighth ratio information as fifth feature information.

The scam address detection apparatus 100 may acquire feature information including sixth feature information.

The scam address detection apparatus 100 may execute acquiring ninth ratio information representing a ratio of cryptocurrency indirectly transmitted to a cryptocurrency transaction service with respect to the entire cryptocurrency transmitted from the benign addresses or the target address 930 included in a scam address group.

Indirect transmission/reception of cryptocurrency means that cryptocurrency transmitted from a departure address reaches a target address by two or more transactions. For example, referring to FIG. 9, in order to transmit cryptocurrency from the target address 930 to the ADDR8 971 or the ADDR9 972, Transaction D 942 and Transaction E 960 may be performed. The scam address detection apparatus 100 may determine that the target address 930 indirectly transmits cryptocurrency to the ADDR8 971 or the ADDR9 972.

Since it is necessary to check transaction histories of a plurality of addresses to determine whether there has been indirect transmission/reception, the processing ability of the scam address detection apparatus 100 may be greatly required. The scam address detection apparatus 100 may determine whether there is indirect transmission/reception of cryptocurrency among addresses within a predetermined number of transaction times. When the scam address detection apparatus 100 determines whether there is indirect transmission/reception within a predetermined number of transaction times, the scam address detection apparatus 100 may prevent the processing ability from being greatly consumed to confirm the indirect transaction. For example, the scam address detection apparatus 100 may determine whether the target address 930 transmits cryptocurrency and whether there is indirect transmission to a cryptocurrency transaction service within 10 or less transactions.

For example, referring to FIG. 9, the size of the entire cryptocurrency transmitted from the target address 930 may be 10 BTC. The target address 930 may indirectly transmit 2 BTC to the ADDR8 971 which is a cryptocurrency transaction service through Transaction D 942 and Transaction E 960. The scam address detection apparatus 100 may determine the ninth ratio information as 20%.

The scam address detection apparatus 100 may execute acquiring tenth ratio information representing a ratio of cryptocurrency indirectly transmitted to a first address included in a scam address group with respect to the entire cryptocurrency transmitted from the target address.

For example, referring to FIG. 9, the size of the entire cryptocurrency transmitted from the target address 930 may be 10 BTC. The target address 930 may indirectly transmit 4 BTC to the ADDR9 972 which is the first address included in the scam address group through Transaction D 942 and Transaction E 960. The scam address detection apparatus 100 may determine the tenth ratio information as 40%.

The scam address detection apparatus 100 may execute acquiring eleventh ratio information representing a ratio of cryptocurrency indirectly transmitted to a second address included in a mule address group with respect to the entire cryptocurrency transmitted at the target address.

The scam address detection apparatus 100 may execute determining the ninth ratio information, the tenth ratio information, and the eleventh ratio information as sixth feature information.

As described above, the scam address detection apparatus 100 may acquire the first feature information to the sixth feature information. The scam address detection apparatus 100 may execute Step 450 of generating a machine learning model on the basis of the first feature information to the sixth feature information.

Figure 10:
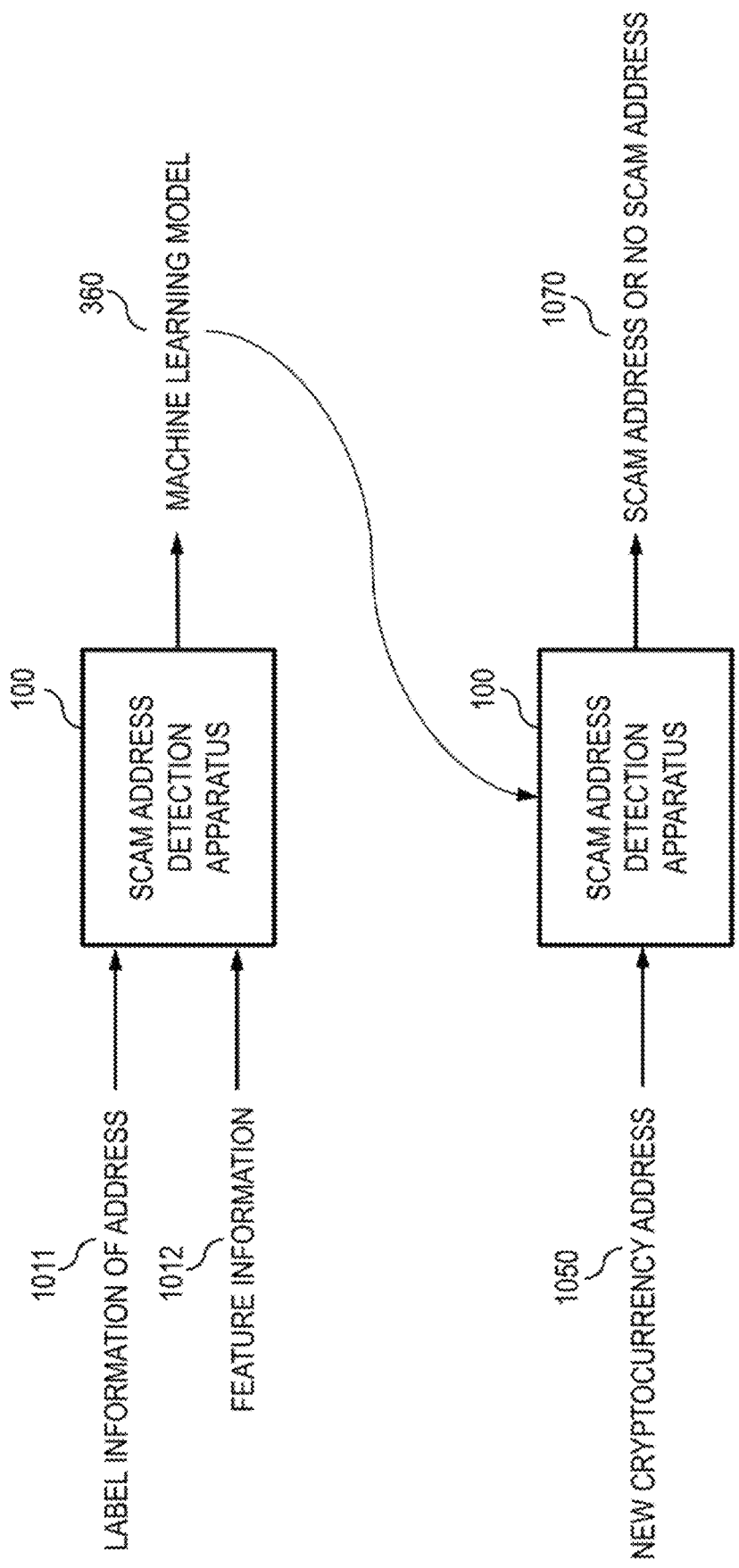
FIG. 10 is a block diagram illustrating an operation of a scam address detection apparatus 100 according to an embodiment of the present disclosure.

FIG. 10 is a block diagram illustrating an operation of a scam address detection apparatus 100 according to an embodiment of the present disclosure.

The scam address detection apparatus 100 may acquire label information 1011 and feature information 1012 of an address from the database 310 and the feature extraction unit 340. The label information 1011 of the address may represent 'benign' or 'scam'. The feature information 1012 may be at least one of the first feature information to the sixth feature information.

The scam address detection apparatus 100 may acquire a machine learning model 360 on the basis of the label information 1011 and the feature information 1012 of an address. The scam address detection apparatus 100 may store the machine learning model 360 in a memory to be used later. In addition, the scam address detection apparatus 100 may transmit the machine learning model 360 to another scam address detection apparatus.

The scam address detection apparatus 100 may execute acquiring a new cryptocurrency address. The scam address detection apparatus 100 may execute acquiring new feature information about the new cryptocurrency address. The scam address detection apparatus 100 may execute determining whether the new cryptocurrency address is a scam address by applying the new feature information to the previously acquired machine learning model 360. In addition, the scam address detection apparatus 100 may output result information 1070 representing whether an address is a scam address.

The scam address detection apparatus 100 may output information about a risk of the new cryptocurrency address on the basis of the machine learning model or the scam address group.

For example, the scam address detection apparatus 100 may execute determining, when the new cryptocurrency address is included in the scam address group, a scam risk of the new cryptocurrency address as 5. The risk of 5 may mean the riskiest. In addition, the risk may be reduced to 1, and the risk of 1 may mean that the risk is low. The risk of 0 may represent that the risk cannot be determined. In the present disclosure, the risk is represented from 0 to 5, but the risk may be represented by other characters or numbers.

The scam address detection apparatus 100 may execute determining, when the new cryptocurrency address directly transacts cryptocurrency with a first address included in the address a scam group, a scam risk of the new cryptocurrency address as 4. The direct transaction of cryptocurrency with the first address means that the first address transmits cryptocurrency to the new cryptocurrency address or the first address receives cryptocurrency from the new cryptocurrency address in one transaction.

The scam address detection apparatus 100 may execute determining, when the new cryptocurrency address indirectly transacts cryptocurrency with a first address included in the scam address group, a scam risk of the new cryptocurrency address as 3. The indirect transaction of cryptocurrency between the new cryptocurrency address and the first address means that the first address transmits cryptocurrency to the new cryptocurrency address through one or more addresses or the first address receives cryptocurrency from the new cryptocurrency address through one or more addresses.

Since it is necessary to check transaction histories of various addresses in order to confirm the indirect transaction, the scam address detection apparatus 100 may need a lot of processing ability to confirm the indirect transaction. The scam address detection apparatus 100 may prevent processing ability from being greatly consumed by checking whether the first address included in the scam address group appears while the cryptocurrency transmitted or received by the new cryptocurrency address goes through a predetermined number of transaction times. The predetermined number may be determined on the basis of the processing ability of the scam address detection apparatus 100. For example, the predetermined number of times may be 10 times.

The scam address detection apparatus 100 may execute determining, when the new cryptocurrency address is determined as a scam address on the basis of the machine learning model, a scam risk of the new cryptocurrency address as 2. The result of the scam address detection apparatus 100 according to the machine learning model may be represented by 'scam' or 'benign'. When the result is 'scam', the scam address detection apparatus 100 may determine the risk as 2. When the result is 'benign', the scam address detection apparatus 100 may check the next step.

The scam address detection apparatus 100 may execute determining, when the new cryptocurrency address has no transaction history, a scam risk of the new cryptocurrency address as 1.

The scam address detection apparatus 100 may execute determining, when a risk is not classified as 1 to 5, a scam risk of the new cryptocurrency address as 0. The risk of 0 may represent that the risk cannot be determined.

So far, various embodiments have been mainly described. Those of ordinary skill in the art to which the present invention pertains will understand that the present invention can be implemented in a modified form without departing from the essential characteristics of the present invention. Therefore, the disclosed embodiments are to be considered in an illustrative rather than a restrictive sense. The scope of the present invention is indicated in the claims rather than the foregoing description, and all differences within the scope equivalent thereto should be construed as being included in the present invention.

Meanwhile, the above-described embodiments of the present invention can be written as a program that can be executed on a computer, and can be implemented in a general-purpose digital computer that operates the program using a computer-readable recording medium. The computer-readable recording medium includes a storage medium such as a magnetic storage medium (e.g., ROM, floppy disk, hard disk, etc.) and an optically readable medium (e.g., CD-ROM, DVD, etc.).

The invention claimed is:

1. A scam address detection method for detecting a cryptocurrency scam address using machine learning in a scam address detection apparatus, the method comprising:
   acquiring information about scam addresses labeled as being used for a scam transaction and information about benign addresses labeled as being used for a normal transaction from a database;
   acquiring information about a scam address group including a plurality of scam addresses determined to be owned by a same user on the basis of the information about the scam addresses;
   acquiring information about a mule address group including a plurality of mule addresses used for money laundering on the basis of the scam address group;
   acquiring feature information corresponding to each of the benign addresses, each of the plurality of scam addresses included in the scam address group and each of the plurality of mule addresses included in the mule address group on the basis of at least one of the information about the benign addresses, the information about the scam address group, and the information about the mule address group; and
   generating a machine learning model by machine learning of the feature information corresponding to each of the benign addresses, each of the plurality of scam addressees, and each of the plurality of mule addresses, and label information corresponding to each of the benign addresses, each of the plurality of scam addressees, and each of the plurality of mule addresses,
   wherein the step of acquiring the feature information comprises acquiring first feature information representing the time from the first transaction to the last transaction of a target address on the basis of the information about the benign addresses, the information about the scam address group, and the information about the mule address group,
   wherein the method further comprises:
   acquiring a new cryptocurrency address,
   acquiring new feature information about the new cryptocurrency address,
   determining whether the new cryptocurrency address is a scam address by applying the new feature information to the machine learning model,
   determining, when the new cryptocurrency address directly transacts cryptocurrency with a first address included in the scam address group, a scam risk of the new cryptocurrency address as a first value, and
   determining, when the new cryptocurrency address indirectly transacts the cryptocurrency with the first address included in the scam address group, the scam risk of the new cryptocurrency address as a second value being lower than the first value.

2. The scam address detection method according to claim 1, wherein the step of acquiring the information about the mule address group comprises:
   acquiring flow of cryptocurrency related to a first scam address included in the scam address group on the basis of the information about the scam address group; and
   determining, as the mule address group, a group of addresses through which cryptocurrency is transmitted from the first scam address to a second scam address included in the scam address group or a scam address group different from the scam address group.

3. The scam address detection method according to claim 1, wherein the step of acquiring the feature information comprises acquiring second feature information representing an average of the time from receiving cryptocurrency of the benign addresses or a target address included in the scam address group to transmitting the cryptocurrency.

4. The scam address detection method according to claim 1, wherein the step of acquiring the feature information comprises:
acquiring first address number information representing the number of departure addresses of transmitting cryptocurrency in first transactions in which cryptocurrency is received at the benign addresses or a target address included in the scam address group per the number of the first transactions;
acquiring second address number information representing the number of destination addresses of receiving cryptocurrency in the first transactions per the number of first transactions;
acquiring third address number information representing the number of departure addresses of transmitting cryptocurrency in second transactions in which cryptocurrency is transmitted from the target address per the number of second transactions;
acquiring fourth address number information representing the number of destination addresses of receiving cryptocurrency in the second transactions per the number of second transactions; and
determining the first address number information, the second address number information, the third address number information, and the fourth address number information as third feature information.

5. The scam address detection method according to claim 1, wherein the step of acquiring the feature information comprises:
acquiring first ratio information representing a ratio of cryptocurrency directly received from an address group including a target address with respect to the entire cryptocurrency received at the benign addresses or the target address included in the scam address group;
acquiring second ratio information representing a ratio of cryptocurrency directly received from a cryptocurrency transaction service with respect to the entire cryptocurrency received at the target address;
acquiring third ratio information representing a ratio of cryptocurrency directly received from a first address included in the scam address group with respect to the entire cryptocurrency received at the target address;
acquiring fourth ratio information representing a ratio of cryptocurrency directly received from a second address included in the mule address group with respect to the entire cryptocurrency received at the target address; and
determining the first ratio information, the second ratio information, the third ratio information, and the fourth ratio information as fourth feature information.

6. The scam address detection method according to claim 1, wherein the step of acquiring the feature information comprises:
acquiring fifth ratio information representing a ratio of cryptocurrency directly transmitted to an address group including a target address with respect to the entire cryptocurrency transmitted from the benign addresses or the target address included in the scam address group;
acquiring sixth ratio information representing a ratio of cryptocurrency directly transmitted to a cryptocurrency transaction service with respect to the entire cryptocurrency transmitted from the target address;
acquiring seventh ratio information representing a ratio of cryptocurrency directly transmitted to a first address included in the scam address group with respect to the entire cryptocurrency transmitted from the target address;
acquiring eighth ratio information representing a ratio of cryptocurrency directly transmitted to a second address included in the mule address group with respect to the entire cryptocurrency received at the target address; and
determining the fifth ratio information, the sixth ratio information, the seventh ratio information, and the eighth ratio information as fifth feature information.

7. The scam address detection method according to claim 1, wherein the step of acquiring the feature information comprises:
acquiring ninth ratio information representing a ratio of cryptocurrency indirectly transmitted to a cryptocurrency transaction service with respect to the entire cryptocurrency transmitted from the benign addresses or a target address included in the scam address group;
acquiring tenth ratio information representing a ratio of cryptocurrency indirectly transmitted to a first address included in the scam address group with respect to the entire cryptocurrency transmitted from the target address;
acquiring eleventh ratio information representing a ratio of cryptocurrency indirectly transmitted to a second address included in the mule address group with respect to the entire cryptocurrency received at the target address; and
determining the ninth ratio information, the tenth ratio information, and the eleventh ratio information as sixth feature information.

8. The scam address detection method according to claim 1, wherein the first value is 4 and the second value is 3, and the method further comprising:
determining, when the new cryptocurrency address is included in the scam address group, the scam risk of the new cryptocurrency address as 5;
determining, when the new cryptocurrency address is determined as a scam address on the basis of the machine learning model, the scam risk of the new cryptocurrency address as 2;
determining, when the new cryptocurrency address has no transaction history, the scam risk of the new cryptocurrency address as 1; and
determining, when a risk is not classified as 1 to 5, the scam risk of the new cryptocurrency address as 0.

9. A scam address detection apparatus for detecting a cryptocurrency scam address using machine learning, the apparatus comprising:
a memory configured to store commands; and
a processor configured to perform commands stored in the memory,
wherein the processor is further configured to:
acquire information about scam addresses labeled as being used for a scam transaction and information about benign addresses labeled as being used for a normal transaction from a database, acquire information about a scam address group including a plurality of scam addresses determined to be owned by a same user on the basis of the information about the scam addresses, acquire information about a mule address group including a plurality of mule addresses used for money laundering on the basis of the scam address group, acquire feature information corresponding to each of the benign addresses, each of the plurality of scam addresses included in the scam address group and each of the plurality of mule addresses included in the mule address group on the basis of at least one of the information about the benign addresses, the information about the scam address group, and the information about the mule address group, and generate a machine learning model by machine learning of the feature information corresponding to each of the benign addresses, each of the plurality of scam addressees, and each of the plurality of mule addresses, and label information corresponding to each of the benign addresses, each of the plurality of scam addressees, and each of the plurality of mule addresses, wherein the processor is further configured to acquire first feature information representing the time from the first transaction to the last transaction of a target address on the basis of the information about the benign addresses, the information about the scam address group, and the information about the mule address group, wherein the processor is further configured to:

acquire a new cryptocurrency address, acquire new feature information about the new cryptocurrency address, determine whether the new cryptocurrency address is a scam address by applying the new feature information to the machine learning model, determine, when the new cryptocurrency address directly transacts cryptocurrency with a first address included in the scam address group, a scam risk of the new cryptocurrency address as a first value, and determine, when the new cryptocurrency address indirectly transacts the cryptocurrency with the first address included in the scam address group, the scam risk of the new cryptocurrency address as a second value being lower than the first value.

10. A non-transitory computer-readable recording medium containing instructions for causing a computer to execute a scam address detection method for detecting a cryptocurrency scam address using machine learning in a scam address detection apparatus, the method comprising:

acquiring information about scam addresses labeled as being used for a scam transaction and information about benign addresses labeled as being used for a normal transaction from a database;

acquiring information about a scam address group including a plurality of scam addresses determined to be owned by a same user on the basis of the information about the scam addresses;

acquiring information about a mule address group including a plurality of mule addresses used for money laundering on the basis of the scam address group;

acquiring feature information corresponding to each of the benign addresses, each of the plurality of scam addresses included in the scam address group and each of the plurality of mule addresses included in the mule address group on the basis of at least one of the information about the benign addresses, the information about the scam address group, and the information about the mule address group; and generating a machine learning model by machine learning of the feature information corresponding to each of the benign addresses, each of the plurality of scam addresses, and each of the plurality of mule addresses, and label information corresponding to each of the benign addresses, each of the plurality of scam addresses, and each of the plurality of mule addresses, wherein the step of acquiring the feature information comprises acquiring first feature information representing the time from the first transaction to the last transaction of the target address on the basis of the information about the benign addresses, the information about the scam address group, and the information about the mule address group, wherein the method further comprises;

acquiring the new cryptocurrency address, acquiring new feature information about the new cryptocurrency address, determining whether the new cryptocurrency address is a scam address by applying the new feature information to the machine learning model, determining, when the new cryptocurrency address directly transacts cryptocurrency with a first address included in the scam address group, a scam risk of the new cryptocurrency address as a first value, and determining, when the new cryptocurrency address indirectly transacts the cryptocurrency with the first address included in the scam address group, the scam risk of the new cryptocurrency address as a second value being lower than the first value.

* * * * *